No. 715,760. Patented Dec. 16, 1902.
C. E. CURTISS.
PNEUMATIC STACKER FOR STALK SHREDDING MACHINES.
(Application filed June 28, 1902.)
(No Model.) 3 Sheets—Sheet 2.
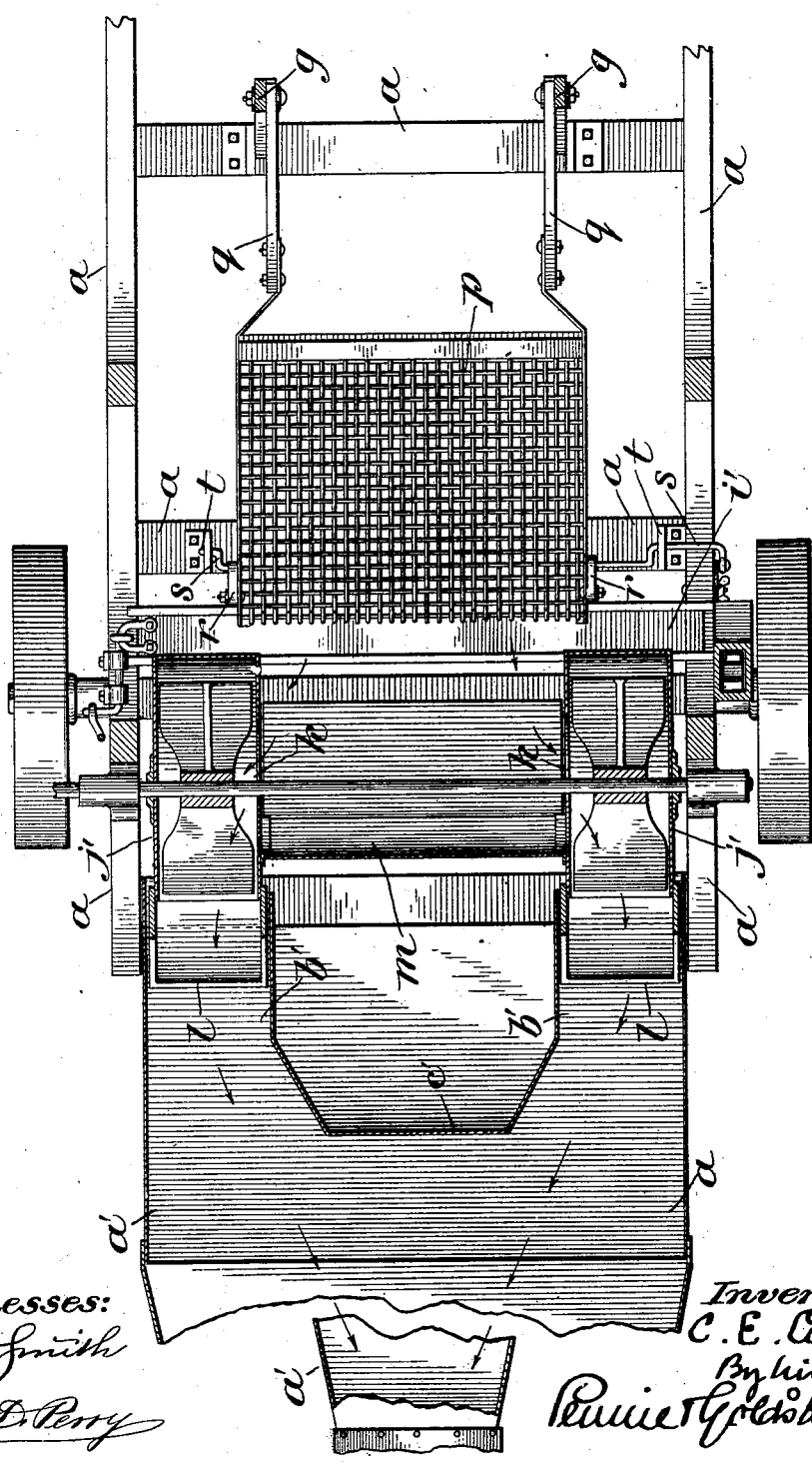

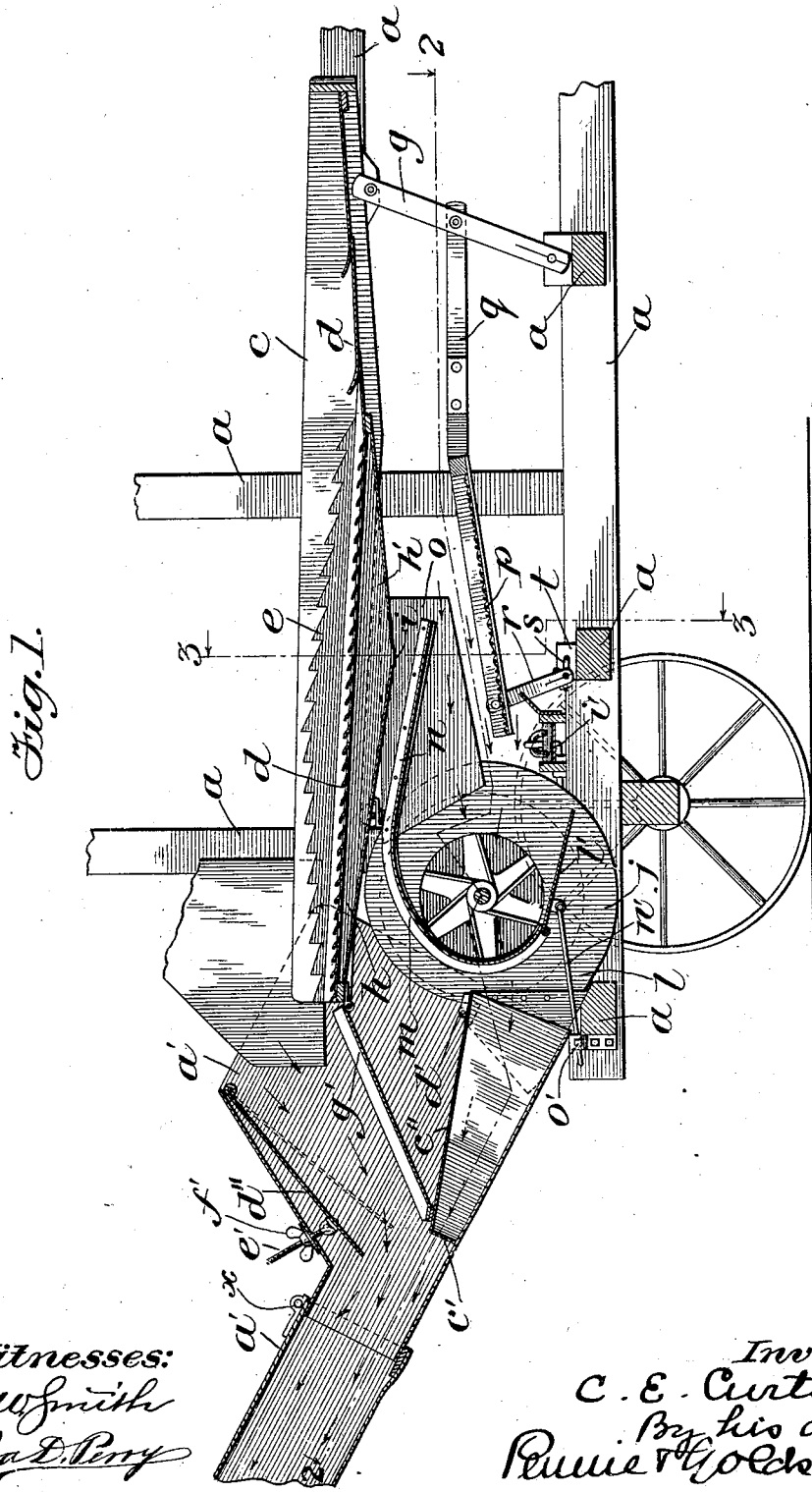

No. 715,760. Patented Dec. 16, 1902.
C. E. CURTISS.
PNEUMATIC STACKER FOR STALK SHREDDING MACHINES.
(Application filed June 28, 1902.)
(No Model.) 3 Sheets—Sheet 3.
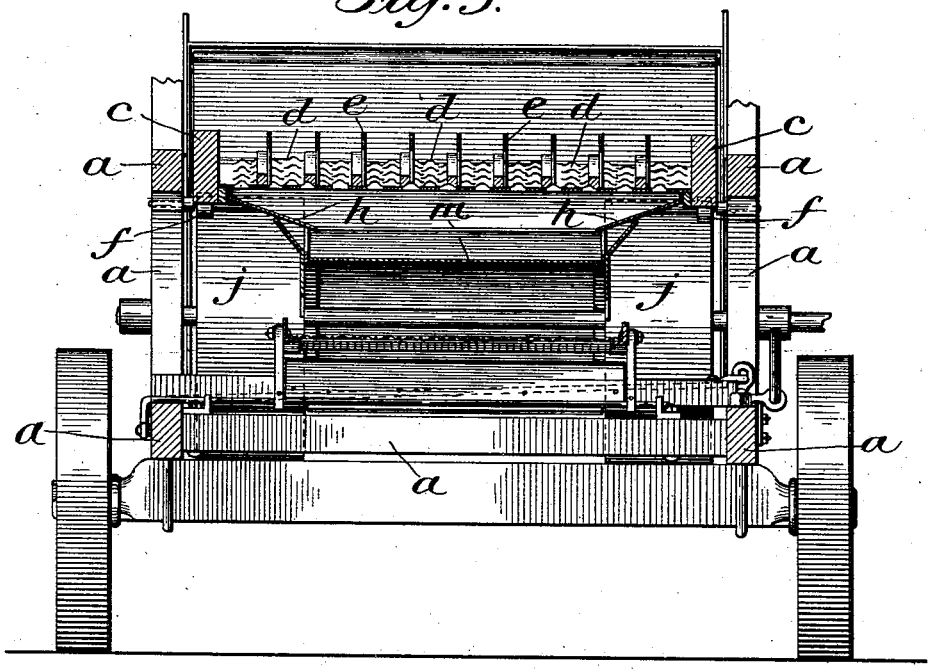
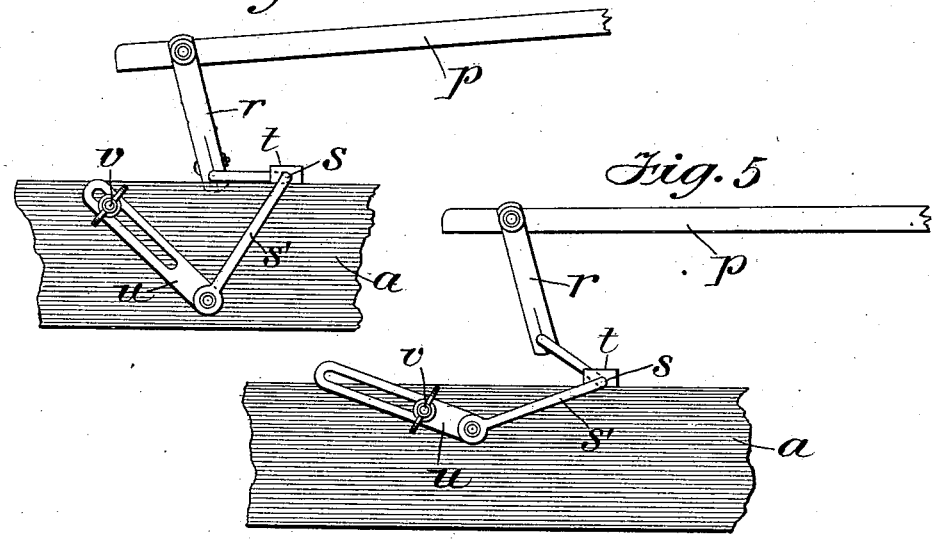
Witnesses: Inventor:
C. W. Smith C. E. Curtiss
Ira D. Perry By his attys.
 Peurie & Goldsborough

UNITED STATES PATENT OFFICE.

CHARLES E. CURTISS, OF CHICAGO, ILLINOIS, ASSIGNOR TO INTERNATIONAL HARVESTER COMPANY, OF CHICAGO, ILLINOIS, A CORPORATION OF NEW JERSEY.

PNEUMATIC STACKER FOR STALK-SHREDDING MACHINES.

SPECIFICATION forming part of Letters Patent No. 715,760, dated December 16, 1902.

Application filed June 28, 1902. Serial No. 113,602. (No model.)

*To all whom it may concern:*

Be it known that I, CHARLES E. CURTISS, a citizen of the United States, residing at Chicago, county of Cook, State of Illinois, have invented certain new and useful Improvements in Pneumatic Stackers for Stalk-Shredding Machines; and I do hereby declare the following to be a full, clear, and exact description of the invention, such as will enable others skilled in the art to which it appertains to make and use the same.

The invention relates generally to machines for shredding fodder, and particularly to the combination therewith of a pneumatic stacker for blowing the shredded stalks and blades from the machine to the stack.

The invention is illustrated in the accompanying drawings, where—

Figure 1 is a central longitudinal vertical section of that part of a shredder to which the invention relates, showing also the receiving end of the conveyer-trunk. Fig. 2 is a plan view of the same on the line 2 2. Fig. 3 is a vertical cross-section on the line 3 3, and Figs. 4 and 5 are detail views of the means for adjusting the angle of the screen which underlies the shaker.

Referring to the views, $a\ a$, &c., denote the framing of the shredder, which may be built up in any preferred manner. The shaker, with which all shredders of this type are provided and which forms the bottom of the chamber wherein the fodder is cut, consists of side boards $c$ and a flooring $d$, usually of metal, a portion of which is perforated or slitted. Toothed bars $e$ are secured to this flooring and extend longitudinally, and the shaker is supported at the discharge end on rollers $f$ and is upheld at the opposite end by a pivoted post $g$. Thus supported it is permitted to be vibrated in the usual way.

Underneath the shaker-flooring $d$ there are arranged two chutes $h\ h'$, which incline downward in opposite directions toward an opening $i$, located about centrally of the length of the perforated part of the flooring, and the sides of both chutes are preferably inclined toward the longitudinal center of the machine, as illustrated in Fig. 3. These chutes are fastened to the under side of the flooring $d$ by cross-strips at their ends and of course move with the shaker as it is vibrated back and forth.

The machine is provided with two rotary fan-blowers having separate casings $j$, one located at each side under the discharge end of the shaker. These casings are closed on their outer sides, as shown at $j'$ in Fig. 2, and have the central openings $k$, which form the eyes of the blowers, on their inner sides. The fan in each of these blowers is located a little eccentric to its casing, the path of revolution of the outer edges of the vanes being nearer the upper edge of the mouth, which forms a cut-off for the blast. Each casing has its mouth $l$ projecting tangentially from the lower side, and spanning the space between the casings and closing it completely at the rear side there is an apron $m$, which curves upward above the level of the eyes of the blowers and thence extends forward in a straight line, inclining downwardly, as shown in Fig. 1, so as to form a chute $n$ underneath the opening $i$ between the oppositely-inclined chutes $h\ h'$. At the sides of this rearwardly-inclined chute there are preferably arranged side boards or curtains $o$, as shown in Fig. 1.

Underneath the shaker, with its forward end extending beyond the rear edge of the chute $n$, there is arranged a screen $p$, which is considerably narrower than the shaker and is approximately the width of the space between the blower-casings. This screen is connected at its forward end by bars $q$ to the pivoted posts $g$, which serve to support the shaker and vibrate it, and at its rear end it is supported by links $r$, that are pivoted at their lower ends on the cranked part of a shaft $s$, which is journaled in bearings $t$ at opposite sides of the machine. The shaft $s$ is provided with a crank-arm $s'$ at one end, by means of which it may be rocked to raise and lower the discharge end of the screen, and the arm $s'$ is provided with some convenient means for locking it—as, for example, a slotted strap $u$ and thumb-screw $v$.

As will be understood on reference to Fig. 1, the chute $n$ is stationary, but the shaker vibrates to and fro and carries oppositely-inclined chutes $h$ $h'$ with it. The screen $p$ also vibrates with the shaker, but has a shorter movement, and in the operation of the machine the shelled corn, dirt, and other heavier matter which passes through the perforated floor of the shaker falls through the opening $i$ on the forward end of the stationary chute and thence passes off to the screen $p$. When the shaker is in its forwardmost position, the opening $i$ is beyond the edge of the fixed chute, and the falling material is directed onto the forward part of the screen $p$; but on the return movement of the shaker the material is delivered onto the chute $n$ and falls thence upon the forward part of the screen. In this manner all the shelled corn is made to travel the whole length of the screen and is thoroughly cleaned.

The conveyer-trunk is shown at $a'$ in Figs. 1 and 2. Instead of being constructed as heretofore it is widened out at its forward or receiving end, so as to take in the delivery-mouths $l$ of both blower-casings. This end of the trunk forms a sort of hood which is closed at the bottom, but is open at the top and rear side. In the lower part of the receiving end the hood is provided with blast-passages $b'$, one for each of the blower-casings. These passages join each other and unite in the front end of the hood, where it narrows into the trunk proper, but are separated from each other between the mouths of the blower-casings by a partition $c'$, so that the air enters the hood only at the sides and bottom.

The conveyer-trunk is pivotally connected to the blower-casings at $d'$ in the usual way and when in operative position stands about as represented in Fig. 1, with the discharge end of the shaker inclosed between its sides and the mouths $l$ of the blower-casings fitted into the rear ends of the blast-passages $b'$. When found necessary, an additional means for adjustment may be provided by making a joint $x$ in the trunk beyond the hood. The upper part of the rear end of the hood therefore forms a throatway, through which the shredded fodder is delivered from the discharge end of the shaker into the trunk, and it is so constructed and proportioned as to prevent back draft; but in order to further provide against any possibility of this back draft a damper $d''$ is pivoted in the upper part of the hood and is provided with a screw-rod $e'$ and thumb-nut $f'$ for adjusting it so as to contract or enlarge the throat.

As the shaker vibrates the shredded material passes off the end and falls into the chute, and for the purpose of insuring its delivery at the right point in the hood there is provided an apron $g'$, which is pivoted at its upper end to the discharge end of the chute and rests freely at its lower end on the top $c''$ of the inclosed space in the lower part of the hood, which partitions off the two blast-passages. As the shaker vibrates this apron slides freely to and fro on this top and delivers the cut stalks, blades, &c., well forward into the body of the hood.

The coaction of the chutes leading from the perforated part of the shaker-floor to the screen $p$ has already been described, and, as will be understood, the shelled corn is discharged into a trough $i'$, whence it is carried to any suitable point of delivery. The fine heavy dirt and trash pass through the screen $p$; but there is a good deal of chaff and other light stuff which it is desirable should be conducted away to the stack, and the adjustment of the discharge end of the screen nearer to or farther from the fixed chute overhead provides for increasing or diminishing the effect of the draft entering the eyes of the blowers by narrowing or widening the passage-way through which it passes. To still further regulate this draft, there is pivoted to the lower part of the shield $m$ a damper $l'$, which is made adjustable by a rod $n'$ and a set-screw $o'$. It is to be noted in respect to this part of the machine that the chaff and light stuff coming from the shaker is delivered into the eyes of the blowers and through them into the trunk instead of passing directly from the screen into the open end of the trunk.

The operation of the machine will be fully understood without further description.

Having thus described my invention, what I claim is—

1. A conveyer-trunk for pneumatic stackers, having an enlarged hood or receiving end, a closed center, and separate blast-passages at the sides.

2. The combination with the shaker, of a pneumatic conveyer-trunk, and independent blowers located under the discharge end of the shaker, the trunk having an enlarged hood or receiving end provided with separate blast-passages connecting with the independent blowers, and the end being closed between the passages.

3. The combination with the shaker, of a pneumatic conveyer-trunk, the receiving end of the trunk being enlarged to inclose the discharge end of the shaker, and the latter having an inclined apron pivoted thereto so as to deliver the material forward into the trunk.

4. The combination with the shaker, of a pneumatic conveyer-trunk, blowers located under the discharge end of the shaker at each side thereof, the conveyer-trunk having an enlarged hood or receiving end, a closed center, and separate blast-passages communicating with the blowers, the discharge end of the shaker projecting into the trunk so as to deliver the cut material directly thereto, and chutes for delivering the chaff and other light material which passes through the shaker into the conveyer-trunk through the blower-casings.

5. The combination of independent blowers at opposite sides of the machine, the casings of said blowers being closed on their outer sides and open on their inner sides, a shaker delivering the cut material beyond the casing, a screen underlying the shaker, and a chute delivering the material passing through the shaker onto the screen whence the chaff passes into the blower-casings.

6. The combination with a shaker, of a pneumatic conveyer-trunk, a blower under the delivery end of the shaker having one side of its casing closed and a mouth opening into the trunk, and a chute under the shaker for directing the material that passes through the shaker into the blower-casing.

7. The combination with independent blowers at opposite sides of the machine, having their casings closed on the outer sides and provided with central openings on the inner sides, of a conveyer-trunk having its receiving end provided with separate blast-openings to accommodate the separate blowers, a shaker for delivering the cut material into the trunk beyond the blowers, and chutes for directing the chaff and other light material into the openings in the inner sides of the casings.

8. The combination of the shaker, the independent blowers at the sides of the machine, the blower-casings being closed at the outer sides and having central openings at the inner sides, the shield $m$ closing the space between the blowers at the rear side, and the chute $n$ for directing the material which falls through the shaker in rear of the shield.

9. The combination of the independent blowers at opposite sides of the machine, having their casings closed on the outside and open on the inside, the shield $m$ closing the space between the casings at the rear, the chute $n$ projecting forwardly from the upper side of the shield so as to leave the space between the blowers open at the front side, and the adjustable damper at the lower side of the shield to contract or enlarge said space.

In testimony whereof I affix my signature in presence of two witnesses.

CHARLES E. CURTISS.

Witnesses:
CHAS. N. CHAMBERS,
F. H. GERE.